(12) United States Patent
Xie et al.

(10) Patent No.: US 9,281,964 B2
(45) Date of Patent: Mar. 8, 2016

(54) METHOD OF ESTABLISHING OPTIMIZED MEDIA PATH AND SIGNALING GATEWAY FOR IMPLEMENTING THIS METHOD

(75) Inventors: Zhenhua Xie, Shenzhen (CN); Zhenwu Hao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 192 days.

(21) Appl. No.: 13/504,546

(22) PCT Filed: Oct. 22, 2010

(86) PCT No.: PCT/CN2010/078009
§ 371 (c)(1),
(2), (4) Date: Apr. 27, 2012

(87) PCT Pub. No.: WO2011/054257
PCT Pub. Date: May 12, 2011

(65) Prior Publication Data
US 2012/0213221 A1      Aug. 23, 2012

(30) Foreign Application Priority Data

Nov. 6, 2009   (CN) .......................... 2009 1 0221364

(51) Int. Cl.
*H04L 12/66* (2006.01)
*H04L 29/06* (2006.01)
*H04L 12/64* (2006.01)
*H04L 12/751* (2013.01)

(52) U.S. Cl.
CPC ............ *H04L 12/66* (2013.01); *H04L 12/6418* (2013.01); *H04L 29/06197* (2013.01); *H04L 29/06217* (2013.01); *H04L 29/06265* (2013.01); *H04L 65/104* (2013.01); *H04L 65/1006* (2013.01); *H04L 65/1016* (2013.01); *H04L 45/02* (2013.01)

(58) Field of Classification Search
None
See application file for complete search history.

(56) References Cited

U.S. PATENT DOCUMENTS 7,535,915 B2 *  5/2009  Collins .......................... 370/410
7,961,714 B1 *  6/2011  Watson et al. ................ 370/352

(Continued)

FOREIGN PATENT DOCUMENTS

CN       1913504 A       2/2007
CN     101079878 A      11/2007

(Continued)

OTHER PUBLICATIONS

International Search Report dated Jan. 27, 2011 for PCT/CN2010/078009.

*Primary Examiner* — Joshua A Kading
(74) *Attorney, Agent, or Firm* — Banner & Witcoff, Ltd.

(57) ABSTRACT

Provided are a method and signaling gateway for establishing an optimized media path applied in an IMS network. The method includes: during the process of forwarding a session description protocol (SDP) request and response, when receiving a SDP response of a first session, a first ALG judging that there is an optimized media path between itself and a second ALG, then when sending the SDP response of the first session, including indication information in the send SDP response; the first ALG sending a SDP request with the target being the second ALG; and after having received the SDP response of the first session including the indication information or after having received the SDP request with the target being the second ALG and the SDP response of the first session including the indication information, the second ALG sending the SDP response of the first session.

7 Claims, 3 Drawing Sheets

(56) References Cited

U.S. PATENT DOCUMENTS

| | | | |
|---|---|---|---|
| 2007/0078986 A1* | 4/2007 | Ethier et al. | 709/227 |
| 2007/0223450 A1* | 9/2007 | Holmstrom et al. | 370/352 |
| 2008/0192733 A1* | 8/2008 | Song et al. | 370/352 |
| 2009/0010270 A1* | 1/2009 | Ejzak | 370/401 |
| 2009/0180476 A1* | 7/2009 | Lee et al. | 370/401 |
| 2010/0098093 A1* | 4/2010 | Ejzak | 370/401 |
| 2011/0202666 A1* | 8/2011 | Heidermark et al. | 709/227 |

FOREIGN PATENT DOCUMENTS

| | | |
|---|---|---|
| JP | H06311243 A | 11/1994 |
| JP | 2002290478 A | 10/2002 |
| JP | 2009506680 A | 2/2009 |
| JP | 2009177338 A | 8/2009 |
| JP | 2009194674 A | 8/2009 |
| WO | 2007045278 A | 5/2007 |
| WO | 2009008978 A2 | 1/2009 |

* cited by examiner

METHOD OF ESTABLISHING OPTIMIZED MEDIA PATH AND SIGNALING GATEWAY FOR IMPLEMENTING THIS METHOD

TECHNICAL FIELD

The present invention relates to the technical field of mobile communication, and particularly, to a method for establishing an optimized IMS media path and a signaling gateway for implementing the method.

BACKGROUND OF THE RELATED ART

The IP Multimedia Core Network Subsystem (abbreviated as IMS) is an IP-based network architecture proposed by the 3rd Generation Partnership Project (abbreviated as 3GPP), and the system constructs an open and flexible service environment, supports multimedia applications, and is capable of providing rich multimedia services to the user.

IMS can be classified as a control layer and a service layer, wherein the control layer mainly includes a call session control function (abbreviated as CSCF) for service triggering and control, and CSCF can further be classified as proxy CSCF (abbreviated as P-CSCF), interrogating CSCF (abbreviated as I-CSCF), and serving CSCF (abbreviated as S-CSCF), wherein I-CSCF and S-CSCF are optional. The service layer mainly includes a series of application servers (abbreviated as AS) for providing specific services, and AS can be an independent entity and can also exist in the S-CSCF. The running manner thereof is as follows: the control layer (S-CSCF) controls service triggering, calls the services on the AS, and achieves the service function according to the subscription information of the user.

At the same time, there are also various gateway devices processing IMS signaling and media in the IMS network, such as P-CSCF and an access gateway (abbreviated as AGW) controlled by P-CSCF, an Interworking Border Control Function (abbreviated as I-BCF) and an Interworking Border Gateway (abbreviated as I-BGW) controlled by I-BCF, a Session Border Control (abbreviated as SBC) of combining signaling with media gateway, an Application Layer Gateway (abbreviated as ALG) and a Transmit Gateway (abbreviated as TrGW) controlled by ALG and so on, and the functions of these gateways are mainly to segment the media path so as to achieve intercommunication between different networks, such as intercommunication between a public network device and a private network device, as well as to achieve intercommunication between entities with different encoding functions by way of encoding conversion; for the sake of easy description, all the signaling gateways can be referred to as ALG, and the media gateways controlled by ALG are referred to as TrGW, and the gateway devices processing IMS signaling and media can be collectively referred to as signaling media gateway, for example, P-CSCF and AGW can be viewed as one signaling media gateway. For the sake of description, the incoming direction of a call establishment request or call update request is referred to as a near end of the media gateway, and the outgoing direction is referred to as a remote end of the media gateway.

Since the final object of a session is to achieve media connection, the media resource information needs to be negotiated in the session, and the protocol for negotiating media resource information in the IMS system is session description protocol (abbreviated as SDP), the interaction manner of the protocol is request and reply mode, i.e. one SDP request must have one SDP reply (unless rejected because an error occurs), the contents of the SDP request and reply are media resource information, which includes media owner information (including address information), media connection address, media type, media port and codec information associated with the media type and so on, and in the contents of the SDP reply, the number of media, the type and the order thereof have to be identical to those in the SDP request. The contents of the SDP protocol are carried by a message body of a session initiation protocol (SIP) message, and the interaction process is independent from the request and reply mode of SIP, that is to say, the SIP request or reply message can include a SDP request, and they can also include a SDP reply, and may also not include the SDP protocol contents.

For the sake of easy description, ALG and TrGW entities are only illustrated in the figure, and other IMS entities merely route the SIP signaling message, which does not affect the description herein.

FIG. 1A is a schematic diagram of establishing an optimized IMS media path in the related art, which describes different media paths and corresponding signaling paths between IMS user equipment UE-A and IMS user equipment UE-B.

As shown in FIG. 1A, the media path established by the existing call process is: UE1, TrGW1a, TrGW2, TrGW3, TrGW4a and UE2, and the optimized media path is: UE1, TrGW1b, TrGW5, TrGW4b, and UE2, and it can be seen that the optimized media path is shorter than the unoptimized media path by one TrGW, therefore, the optimized media path can save more resources and is more efficient. In this case, the signaling gateway ALG1 controls TrGW1a and TrGW1b, ALG2 controls TrGW2, ALG3 controls TrGW3, ALG4 controls TrGW4a and TrGW4b, and ALG5 controls TrGW5.

FIG. 1B is a flowchart of establishing an optimized IMS media path in the related art, corresponding to the schematic diagram in FIG. 1A, and it mainly includes the following steps:

in step 101, UE1 sends a SDP request to UE2 for negotiating media resource information, for example, by sending a call signaling of SIP, i.e. INVITE request, or update signaling, i.e. reINVITE request, the message body of the SIP request includes this SDP request, and the contents of the SDP request is the media resource information of UE1;

in step 102, the SDP request reaches the signaling gateway ALG1, and the signaling gateway ALG1 selects TrGW1a as a media gateway, and it controls the media gateway to use the media resource information in the SDP request and allocate media resources for connecting the remote end, and ALG1 replaces media resource information in the SDP request with the media resource information of TrGW1a for connecting the remote end, and then forwards the SDP request after having added the information associated with ALG1 and information associated with session identifier into this SDP request, for example, performing the forwarding by forwarding a SIP signaling including the SDP request;

in step 103, the SDP request reaches the signaling gateway ALG2, and the signaling gateway ALG2 selects TrGW2 as a media gateway, and it controls the media gateway to use the media resource information in the SDP request and allocate media resources for connecting the remote end, and ALG2 replaces media resource information in the SDP request with the media resource information of TrGW2 for connecting the remote end, and then forwards the SDP request after having added the information associated with ALG2 and information associated with session identifier into the SDP request, for example, performing the forwarding by forwarding a SIP signaling including the SDP request;

in step 104, the SDP request reaches the signaling gateway ALG3, and the signaling gateway ALG3 selects TrGW3 as a media gateway, and it controls the media gateway to use the media resource information in the SDP request and allocate media resources for connecting the remote end, and ALG3 replaces media resource information in the SDP request with the media resource information of TrGW3 for connecting the remote end, and then forwards the SDP request after having added the information associated with ALG3 and information associated with session identifier into the SDP request, for example, performing the forwarding by forwarding a SIP signaling including the SDP request;

in step 105, the SDP request reaches the signaling gateway ALG4, and the signaling gateway ALG4 selects TrGW4*a* as a media gateway, and it controls the media gateway to use the media resource information in the SDP request and allocate media resources for connecting the remote end, and ALG4 replaces media resource information in the SDP request with the media resource information of TrGW4*a* for connecting the remote end, and then forwards the SDP request after having added the information associated with ALG4 and information associated with session identifier into this SDP request, for example, performing the forwarding by forwarding a SIP signaling including the SDP request, and the forwarded SDP request finally reaches UE2;

in step 106, UE2 carries out negotiation by using the media resource information in the SDP request, then sends a SDP response including the media resource information of UE2, for example, sending "200 OK" reply of the SIP signaling, and the SDP response is sent by being included in the message body of the SIP reply, and the SDP response reaches ALG4;

in step 107, ALG4 judges that there is a shorter path between ALG4 and ALG1 according to the received information associated with each ALG in the path, then it sends a negotiation request message of the SIP to ALG1 so as to establish a second media path segment and carry some received information associated with ALG1, for example, sending an INVITE message without SDP request, with the target of the message being the address of ALG1, and information associated with session identifier provided by ALG1 is included, and the SIP signaling will establish one new session signaling channel;

in step 108, the negotiation request message of SIP is routed to ALG5, and ALG5 forwards the message to ALG1;

in step 109, the negotiation request message of SIP reaches ALG1, and ALG1 selects TrGW1*b* as a media gateway (the selection can be carried out according to information such as the incoming direction of the negotiation request message and so on) to allocate media resources for connecting the remote end, and two media negotiations are associated, and ALG1 generates a SDP request by using the media resource information for connecting the remote end of TrGW1*b* and sends the SDP request so as to negotiate the media resource information, for example, by sending the "200 OK" reply of the SIP signaling, and the SDP request is included in the message body of the SIP reply;

in step 110, the SDP request reaches the signaling gateway ALG5, and the signaling gateway ALG5 selects TrGW5 as a media gateway, and it controls the media gateway to use the media resource information in the SDP request and allocate media resources of TrGW5 for connecting the remote end, and ALG5 replaces media resource information in the SDP request with the media resource information for connecting the remote end of TrGW5, then forwards the SDP request, for example, performing the forwarding by forwarding a SIP signaling including the SDP request, the forwarded SDP request finally reaches ALG4;

in step 111, ALG4 decides to select a second media path segment, then it selects TrGW4*b* as a media gateway and controls the media gateway to use the media resource information in the SDP request and allocate media resources for connecting the remote end, and ALG4 replaces media resource information in the SDP request with the media resource information for connecting the remote end of TrGW4*b*, then forwards the SDP request, for example, performing the forwarding by including the SDP request in the message body of the UPDATE request of SIP signaling, the forwarded SDP request finally reaches UE2;

in step 112, UE2 receives the new SDP request, and update is carried out to use the media resource information in the SDP request, and a SDP response is sent to ALG4, and the contents of the SDP response are the media resource information of UE2, for example, by way of the "200 OK" reply of the SIP signaling, the SDP response is included in the message body of the SIP reply, and the SDP response reaches ALG4;

in step 113, ALG4 generates a SDP response by using the media resource information of TrGW4*b* and sends the SDP response to ALG5, for example, by sending an ACK (acknowledgement) request of the SIP signaling, and the SDP reply is included in the message body of the SIP request;

in step 114, the SDP response reaches signaling gateway ALG5, and ALG5 replaces the media resource information in the SDP response with the media resource information of TrGW5, then forwards the SDP response to ALG1, for example, performing the forwarding by forwarding a SIP signaling including the SDP response, the forwarded SDP response finally reaches ALG1, and ALG1 controls TrGW1*b* to use the media resource information in the SDP response;

in step 115, at the same moment with step 113, ALG4 generates a SDP response which includes invalid media resource information so as to indicate that the media gateway allocated in the original session signaling channel is released, for example, setting the port number of the media as 0 and sending the SDP response via the original session signaling channel, for example, by sending the "200 OK" reply of the SIP signaling, and the SDP response is included in the message body of the SIP reply;

in steps 116-117, the SDP response reaches ALG1 via ALG3 and ALG2 respectively, and ALG3, ALG2 and ALG1 release various media gateways allocated in the original session signaling channel, i.e. TrGW3, TrGW2, and TrGW1*a*; and in step 118, ALG1 controls TrGW1*b* to allocate the media resource information and replaces the media resource information in the SDP response in step 117 with the media resource information, and then forwards the SDP response, for example, performing the forwarding by forwarding a SIP signaling including the SDP response, the forwarded SDP response finally reaches UE1.

So far, the optimized media path is established, and the media path is UE1, TrGW1*b*, TrGW5, TrGW4*b* and UE2.

It can be seen from the above description that the existing method for establishing an optimized media path delays the completion time of the SDP request and response in the original session signaling channel, thereby affecting the call establishment time.

SUMMARY OF THE INVENTION

The technical problem to be solved by the present invention is to a method for establishing an optimized media path and a signaling gateway for implementing the method, which effectively shortens the call establishment time.

In order to solve the above technical problem, the present invention provides a method for establishing an optimized media path applied in an IMS network, and the method comprises:

during the process of forwarding a session description protocol (SDP) request and response, when receiving a SDP response of a first session, a first ALG judging that there is an optimized media path between itself and a second ALG, then when sending the SDP response of the first session, including indication information in the SDP response which is sent;

the first ALG sending a SDP request with a target being the second ALG; and after having received the SDP response of the first session including the indication information or after having received the SDP request with the target being the second ALG and the SDP response of the first session including the indication information, the second ALG sending the SDP response of the first session.

The indication information is used for indicating that an optimized media path with the second ALG is established, and the SDP response of the first session sent by the first ALG and second ALG further includes resource information for establishing the optimized media path.

The indication information in the SDP response of the first session includes an association identifier, and in the step of the first ALG sending the SDP request with the target being the second ALG, the association identifier is included in a session initiation protocol (SIP) message including the SDP request.

The method further comprises: after having received the SDP request with the target being the second ALG, the second ALG initiating the release of media path resource of the first session.

The indication information comprises information associated with the second ALG.

The present invention also provides another method for establishing an optimized media path applied in an IMS network, and the method comprises:

during the process of forwarding a session description protocol (SDP) request and response, when receiving a SDP response of a first session, a first ALG judging that there is an optimized media path between itself and a second ALG, then when sending the SDP response of the first session, including indication information in the SDP response which is sent; and after having received the SDP response of the first session including the indication information, the second ALG sending a SDP request with a target being the first ALG.

The method as claimed in claim 6, wherein the indication information is used for indicating that an optimized media path with the second ALG is established, the method further comprises:

after having received the SDP response of the first session including the indication information, the second ALG sending the SDP response of the first session, the sent SDP response including resource information for establishing the optimized media path.

The method further comprises: after having received the SDP request with the target being the first ALG, the first ALG sending a SDP response of a second session; and after having received the SDP response of the second session, the second ALG initiating the release of media path resource of the first session.

The indication information comprises information associated with the first ALG and information associated with the second ALG.

The present invention also provides an ALG for establishing an optimized media path, comprising: a switch-out module and a switch-in module, wherein the switch-out module is configured to: during the process of forwarding a SDP request and response, when receiving a SDP response of a first session, judge that there is an optimized media path between present ALG and another ALG in a media path of first session, then when sending the SDP response of the first session, include indication information in the sent SDP response; and send a SDP request with a target being said another ALG;

the switch-in module is configured to: after having received the SDP response of the first session including the indication information associated with the present ALG or after having received the SDP request with the target being the present ALG and the SDP response of the first session including the indication information associated with the present ALG, send the SDP response of the first session.

Both the SDP request and the SDP response of the first session forwarded by the switch-out module include an association identifier.

The SDP response of the first session sent by the switch-out module and switch-in module further includes resource information for establishing the optimized media path.

The ALG further comprises an intermediate module configured to: after having received a SDP response of the first session including indication information unassociated with the present ALG, send the SDP response of the first session including indication information unassociated with the present ALG.

The present invention also provides another ALG for establishing an optimized media path, comprising: a switch-out module and a switch-in module, wherein the switch-out module is configured to: during the process of forwarding a SDP request and response, when receiving a SDP response of a first session, judge that there is an optimized media path between itself and another ALG in a media path of the first session, then when sending the SDP response of the first session, include indication information in the sent SDP response; and the switch-in module is configured to: after having received a SDP response of the first session including indication information associated with the present ALG, send a SDP request with the target being the ALG which is indicated in the indication information as having an optimized media path with the present ALG.

The switch-in module is further configured to: after having received the SDP response of the first session including indication information associated with the present ALG, send the SDP response of the first session; and the SDP response of the first session sent by the switch-out module and switch-in module further includes resource information for establishing the optimized media path.

The switch-out module is further configured to: after having received the SDP request with the target being the present ALG, send a SDP response of a second session; and the switch-in module is further configured to: after having received the SDP response of the second session, initiate the release of the media path resource of the first session.

The ALG further comprises an intermediate module configured to: after having received a SDP response of the first session including indication information unassociated with the present ALG, send the SDP response of the first session including indication information unassociated with the present ALG.

With the method and signaling gateway of the present invention, the call establishment time can be effectively shorted, providing better usage experience for the user.

BRIEF DESCRIPTION OF DRAWINGS

The drawings are used to provide a further understanding for the present invention, and they constitute a part of the specification. The drawings are used to illustrate the present invention along with embodiments of the present invention and they are not intended to limit the present invention. In the drawings.

PREFERRED EMBODIMENTS OF THE PRESENT INVENTION

Figure 1A:
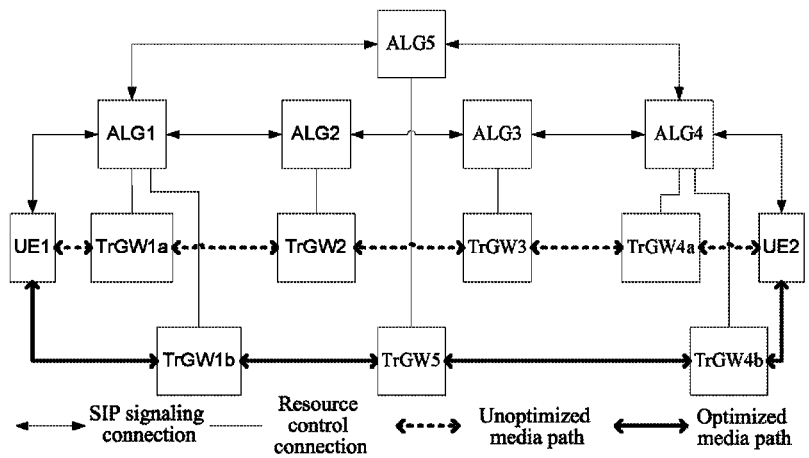
FIG. 1A is a schematic diagram of establishing an optimized IMS media path in the related art.

The inventive concept of the present invention is to shorten the establishment time by actively initiating a call.

The method of the present invention comprises:

a) during the process of forwarding a session description protocol (SDP) request and response, when receiving a SDP response of a first session, a first signaling gateway (ALG) judging there is an optimized media path between itself and a second ALG, then when sending the SDP response of the first session, including indication information in the SDP response which is sent;

b) the first ALG sending a SDP request with the target being the second ALG; and c) after having received the SDP response of the first session including the indication information or after having received the SDP request with the target being the second ALG and the SDP response of the first session including the indication information, the second ALG sending the SDP response of the first session.

The sent SDP response of the first session includes resource information for the optimized media path. The SDP response of the first session is sent to complete the establishment or update of the first session; and after having received the SDP request with the target being the second ALG, the second ALG initiates the release of the media path resource of the first session.

After having received the above SDP request with the target being itself, the second ALG sends a SDP response by a second session to complete the establishment of the second session.

The indication information in the SDP response of the first session includes an association identifier, and when the first ALG sends the SDP request with the target being the second ALG, the association identifier is included in a session initiation protocol (SIP) message including the SDP request; the second ALG associates the first session with the second session according to the association identifier.

In this method, the indication information is used for indicating that the optimized media path to be established is associated with the second ALG, which mainly includes information associated with the second ALG, such as the location of the media gateway controlled by the second ALG, or includes serial number information in media path of the first session.

Alternatively, after step a), perform the following step:

b1) after having received the SDP response of the first session including the indication information, the second ALG sends a SDP request to the first ALG.

Furthermore, after having received the SDP response of the first session including the indication information, the second ALG forwards the SDP response of the first session to complete the establishment or update of the first session; the SDP response includes resource information for the optimized media path.

Furthermore, after having received the above SDP request with the target being itself, the first ALG sends a SDP response of a second session to complete the establishment of the second session. After having received the SDP response of the second session, the second ALG initiates the release of the media path resource of the first session.

In this method, the indication information is used for establishing an optimized media path between the first ALG and the second ALG, which mainly includes information associated with the first ALG and information associated with the second ALG. The information associated with ALG, for example, can be location information of the media gateway control by ALG.

As to one signaling gateway, it can either be the above first signaling gateway or the above second signaling gateway. In different call procedures, one signaling gateway may be simultaneously used as the first signaling gateway and second signaling gateway, therefore, it should possess all the functions of the above first signaling gateway and all the function of the above second signaling gateway.

A signaling gateway for implementing the above method comprises a switch-out module and a switch-in module, wherein the switch-out module is configured to: during the process of forwarding a session description protocol (SDP) request and response, when receiving a SDP response of a first session, judge that if there is an optimized media path between itself and a certain ALGx in a media path of the first session, then when forwarding the SDP response of the first session, include indication information in the SDP response; and send the SDP request with the target being ALGx; and the switch-in module is configured to: after having received the SDP response of the first session including the indication information associated with present ALG or after having received the SDP request with the target being the present ALG and the SDP response of the first session including the indication information associated with the present ALG, forward the SDP response of the first session.

The signaling gateway can also be other signaling gateway in the path between the first signaling gateway and second signaling gateway, at this moment, the signaling gateway can also include an intermediate module for sending the SDP response of the first session including indication information which is unassociated with the present ALG after having received the SDP response of the first session including indication information which is unassociated with the present ALG.

Another signaling gateway for implementing the above method comprises a switch-out module and a switch-in module, wherein the switch-out module is configured to: during the process of forwarding a session description protocol (SDP) request and response, when receiving a SDP response of a first session, judge that there is an optimized media path between itself and a certain ALGx in a media path of the first session, then when forwarding the SDP response of the first session, include indication information in the SDP response; and the switch-in module is configured to send a SDP request to the ALGx indicated in the indication information after having received the SDP response of the first session including the indication information.

The signaling gateway can also be other signaling gateway in the path between the first signaling gateway and second signaling gateway, at this moment, the signaling gateway can also include an intermediate module for sending the SDP response of the first session including indication information which is unassociated with the present ALG after having received the SDP response of the first session including indication information which is unassociated with the present ALG.

A description is given to the preferred embodiments of the invention with reference to the accompanying drawings. The preferred embodiment of the present invention is only described for the purpose of illustration and explanation, not for limiting the present invention.

In the figures of the following embodiments, the dashed lines represent an optional or conditional signaling message.

Embodiment I

Figure 1B:
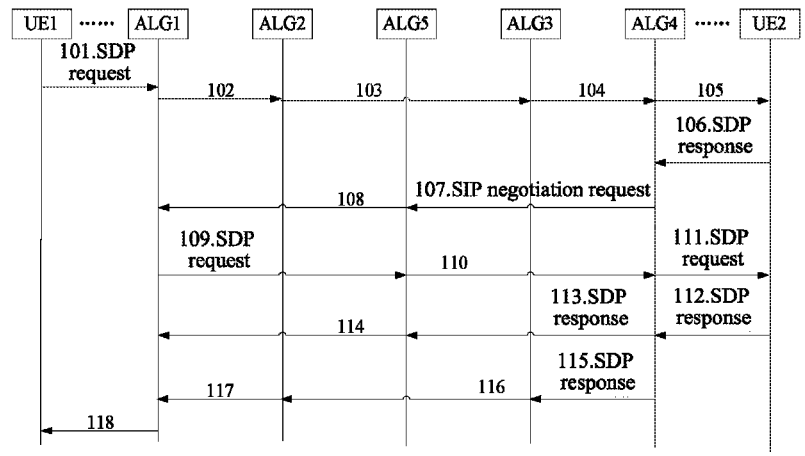
FIG. 1B is a flowchart of establishing an optimized IMS media path in the related art.
Figure 2:
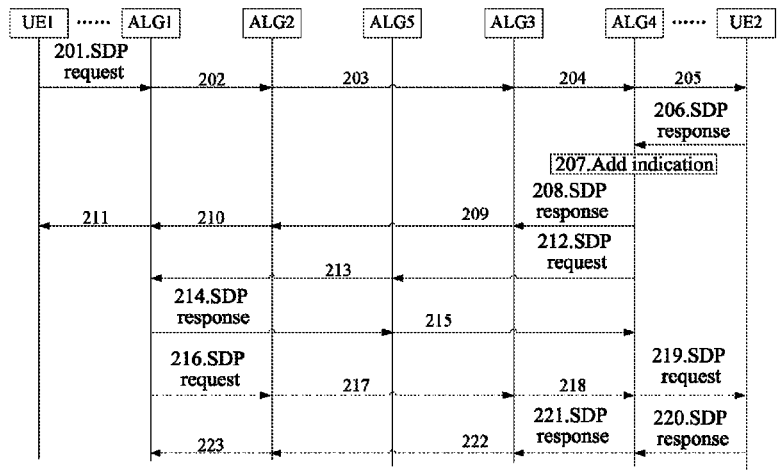
FIG. 2 is a flowchart of embodiment I.

FIG. 2 shows a flowchart of the embodiment corresponding to FIG. 1A, in which UE1 and UE2 establish a call, including several session establishment processes, and it mainly includes the following steps:

steps 201-206 are the same as steps 101-106 in FIG. 1B;

In step 207, ALG4 receives the SDP response, and ALG4 controls the media gateway TrGW4a to use the media resource information in the SDP response and allocate media resources for connecting the near end, and ALG4 judges whether there is an optimized media path between ALG4 and ALG1 according to the received information associated with each ALG in the path, for example, ALG4 judges that the geographical location from ALG1 is relatively near according to the geographical location information and there is a shorter path, then it generates indication information to be added into the SDP response so as to indicate that an optimized media path between itself and ALG1 is expected to be established, and the indication information can also include an association identifier for associating the subsequent SDP request;

so far, a media connection is established between UE2 and TrGW4a.

Each ALG in the media path can judge whether there is an optimized media path, and if it is judged that there is an optimized media path between itself and a certain ALGx, then the indication information is included in the returned response, so as to indicate that an optimized media path between itself and ALGx is established, and other ALGs may not judge whether there is an optimized media path after having received the response including the indication information.

ALG judges whether there is an optimized media path according to the geographical location information included in the SDP request or information associated with location such as ALG domain name and so on, for example, ALG1 includes the geographical location information of TrGW1b in a SDP request messages, then ALG4 judges that TrGW1b is near from the geographical location of TrGW4b, then it is deemed that there is an optimized path, and it generates indication information about establishing an optimized media path with ALG1.

The indication information mainly includes information associated with ALG1 and can also include information associated with ALG4. The information associated with ALG can be information associated with location, such as geographical location information (including information of TrGW controlled by the ALG) or ALG domain name and can also be serial number information of the current media path where the relevant ALG (it is ALG1 in this embodiment) is located, i.e. the original media path.

In step 208, ALG4 generates a SDP response by using the media resource information of TrGW4a for connecting the near end, and adds the generated indication information in the SDP response, and sends the SDP response, for example, performing the forwarding by forwarding a SIP signaling including the SDP response;

in step 209, the SDP response reaches ALG3, and ALG3 controls media gateway TrGW3 to use the media resource information in the SDP response and allocate media resources for connecting the near end, and ALG3 replaces the media resource information in the SDP response with the media resource information for connecting the near end of TrGW3, then it forwards the SDP response, for example, performing the forwarding by forwarding a SIP signaling including SDP response;

so far, a media connection is established between TrGW4a and TrGW3.

In step 210, the SDP response reaches ALG2, and ALG2 controls media gateway TrGW2 to use the media resource information in the SDP response and allocate media resources for connecting the near end, and ALG2 replaces the media resource information in the SDP response with the media resource information for connecting the near end of TrGW2, then forwards the SDP response, for example, performing the forwarding by forwarding a SIP signaling including the SDP response;

so far, a media connection is established between TrGW3 and TrGW2.

In step 211, the SDP response reaches ALG1, and ALG1 judges that the SDP response includes the indication information for establishing an optimized path, and the indication information is relevant thereto, then TrGW1b is selected to be a media gateway for the optimized media path and allocate media resources for connecting the near end, and ALG1 generates a SDP response by using the media resource information for connecting the near end of TrGW1b and sends the SDP response, for example, performing the forwarding by forwarding a SIP signaling including the SDP response, and UE1 negotiates the media by using the media resource information in the received SDP response;

in this embodiment, if ALG1 manages a plurality of TrGWs, then ALG can carry out selection according to the location information associated with ALG4 included in the indication information or carry out selection according to other methods in the related art.

So far, a media connection between TrGW2 and TrGW1a and a media connection between UE1 and TrGW1b are both established.

In step 212, at the same moment when step 208 is carried out, ALG4 selects TrGW4b to be a media gateway for the optimized media path and allocate media resources for connecting the near end, and ALG4 generates a SDP request by using the media resource information for connecting the near end of TrGW4b and sends the SDP request, for example, by sending an INVITE request, and the SDP request is sent by being included in the message body of the SIP request, and the SIP request can include the association identifier generated in step 207, which can be included in the message header, for example, it is included in the Target-Dialog head domain or Replaces head domain, or it can also be included in a message body, i.e. included in the SDP request;

in step 213, the SDP request reaches ALG5, and ALG5 selects TrGW5 to be a media gateway, controls the media gateway to use the media resource information in the SDP request and allocate media resources for connecting the near end, and ALG5 generates a SDP request by using the media resource information for connecting the near end of TrGW5 and sends the SDP request, for example, performing the forwarding by forwarding a SIP signaling including the SDP request;

With steps 202-210, the media path from ALG1 to ALG4 is established. With steps 212-213, ALG4 initiates a session to ALG1, since the SDP response sent by ALG4 in step 208 includes an association identifier and in step 212, the SDP request sent by ALG4 also includes an association identifier, when ALG1 receives the SDP response and SDP request, it deems that the established session from ALG1 to ALG4 is associated with the new session initiated by ALG4, both belonging to the session under the same call.

In step 214, the SDP request finally reaches ALG1, and ALG1 controls media gateway TrGW1b to use the media resource information in the SDP request and allocate media resources for connecting the remote end, which are resources for the optimized media path, and ALG1 generates a SDP response by using the media resource information for connecting the remote end of TrGW1b and sends the SDP response, for example, by way of sending "200 OK" reply of the SIP signaling, sending the SDP response by being included in the message body of the SIP reply;

so far, a media connection is established between TrGW1b and TrGW5.

In step 215, the SDP response reaches ALG5, and ALG5 controls media gateway TrGW5 to use the media resource information in the SDP response and allocate media resources for connecting the remote end, and ALG5 generates the SDP response by using the media resource information for connecting the remote end of TrGW5, then sends the SDP response, for example, performing the forwarding by forwarding a SIP signaling including the SDP response, and the SDP response reaches ALG4, and ALG4 controls TrGW4b to use the media resource information in the SDP response;

so far, a media connection between TrGW5 and TrGW4b is established, and an optimized media path from ALG1 to ALG4 has been established.

In step 216, if ALG1 wants to release various media gateways in the original media path, ALG1 can send a new SDP request along the original session path, which includes invalid media resource information so as to indicate that the resources in the media path are released, for example, by sending a reINVITE request of the SIP signaling, and the SDP request is sent by being included in the message body of the SIP request;

in step 217, the SDP request reaches ALG2, and ALG2 releases the resources of TrGW2 for the original media path, and forwards the SDP request, for example, performing the forwarding by forwarding a SIP signaling including the SDP request;

in step 218, the SDP request reaches ALG3, and ALG3 releases the resources for the original media path of TrGW3, and forwards the SDP request, for example, performing the forwarding by forwarding a SIP signaling including the SDP request;

Steps 216-218 are optional.

Step 219 can be performed after step 215 or after step 218, if TrGW4b is different from TrGW4a, then ALG4 controls TrGW4b to allocate media resources for connecting the remote end, and ALG4 generates a SDP request by using the media resource information for connection the remote end of TrGW4b and sends the SDP request to UE2, for example, if after step 218, the SDP request can be forwarded by forwarding a SIP signaling including the SDP request, or if after step 215, by sending a reINVITE request of the SIP signaling, SDP request is sent by being included in the message body of the SIP request;

in step 220, the SDP request reaches UE2, and UE2 carries out media negotiation by using the media resource information in the SDP request, then sends a SDP response including the media resource information of UE2, for example, sending "200 OK" reply of the SIP signaling, the SDP response is sent by being included in the message body of the SIP reply;

so far, a media connection is established between UE2 and TrGW4b.

Step 221 can be after step 220 and can also be after step 218, and ALG4 sends a new SDP response along the original session path, which includes invalid media resource information for indicating that the resources in the media path have already been released, for example, if after step 220, the SDP response can be forwarded by forwarding a SIP signaling including the SDP response, or if after step 218, by sending "200 OK" reply of the SIP signaling, the SDP response is sent by being included in the message body of the SIP reply;

in step 222, the SDP response reaches ALG3, and ALG3 forwards the SDP response, for example, performing the forwarding by forwarding a SIP signaling including the SDP response;

in step 223, the SDP response reaches ALG2, and ALG2 forwards the SDP response, for example, performing the forwarding by forwarding a SIP signaling including the SDP response;

after steps 216 to 218 have been performed, steps 221 to 223 need to be performed.

So far, an optimized media path is established, and the media path is UE1, TrGW1b, TrGW5, TrGW4b and UE2, the original media path is TrGW1a, TrGW2, TrGW3, TrGW4a and UE2 which is released through steps 216 to 223, wherein the media connection between TrGW4a and UE2 is updated as the media connection between TrGW4b and UE2 by way of steps 219 to 220. In this embodiment, no media connection is established between TrGW1a and UE1 during the establishment of the original media path, because an optimized media path will be used, and there is no need to establish this segment of media connection.

Embodiment II

Figure 3:
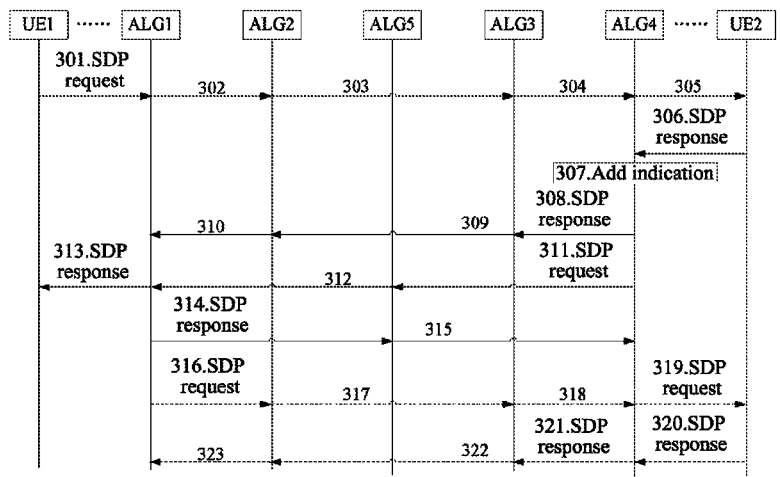
FIG. 3 is a flowchart of embodiment II.

FIG. 3 shows a flowchart of the embodiment corresponding to FIG. 1A, which mainly includes the following steps:

steps 301 to 310 are the same as steps 201 to 210 in FIG. 2;

steps 311 to 312 are the same as steps 212 to 213 in FIG. 2;

in step 313, the SDP response in step 310 reaches ALG1, and ALG1 judges that the SDP response includes the indication information that an optimized path is expected to be established and the indication information is relevant thereto, then it waits for a request of establishing a new media path, and the new SDP request of establishing a new media path in step 312 reaches ALG1, and ALG1 selects TrGW1b as the media gateway in the optimized media path to allocate media resources for connecting the near end, and ALG1 generates a SDP response by using the media resource information of TrGW1b for connecting the near end and sends the SDP response, for example, the SDP response is forwarded by forwarding a SIP signaling which includes the SDP response in the original session path;

During implementation, the order for the SDP response of step 310 and SDP request of step 312 reaching ALG1 may be different, if ALG1 firstly receives the SDP request of 312, then the SDP response in step 310 may not be awaited, and step 313 can be executed directly.

The selection of TrGW by ALG1 can also be determined according to the incoming direction or outgoing direction of the message in step 312, besides according to information associated with location in the indication information.

Steps 314 to 323 are the same as steps 214 to 223 in FIG. 2;

So far, an optimized media path is established, and the media path is UE1, TrGW1b, TrGW5, TrGW4b and UE2, and the original media path is TrGW1a, TrGW2, TrGW3, TrGW4a and UE2 which is released through steps 316 to 323, wherein the media connection between TrGW4a and UE2 is updated as the media connection between TrGW4b and UE2 by way of steps 319 to 320. In this embodiment, no media connection is established between TrGW1a and UE1 during the establishment of the original media path, because an optimized media path will be used, and there is no need to establish this segment of media connection.

Embodiment III

Figure 4:
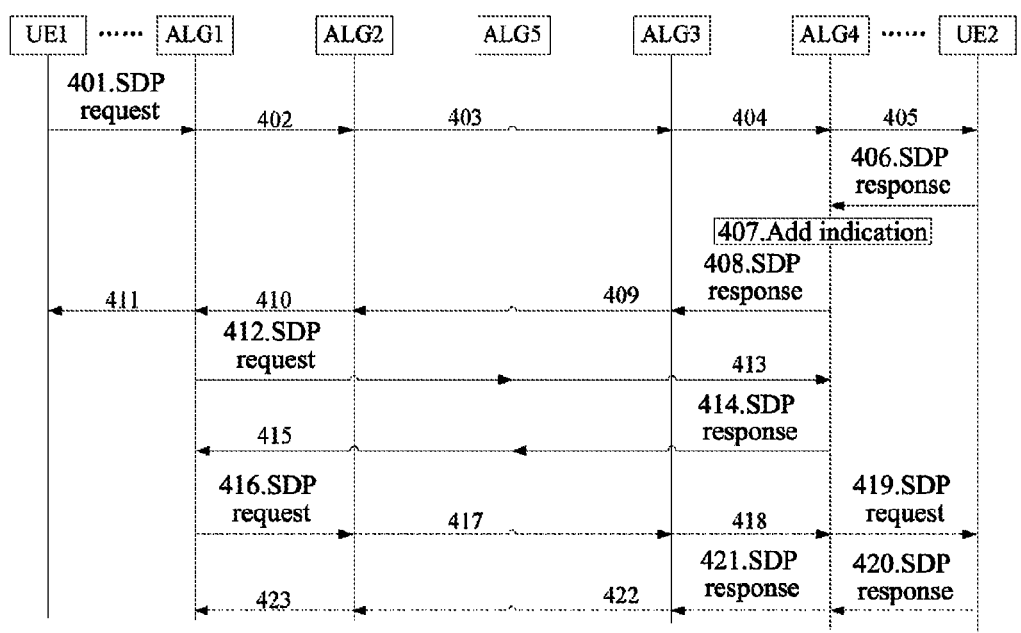
FIG. 4 is a flowchart of embodiment III.

FIG. 4 shows a flowchart of the embodiment corresponding to FIG. 1A, but the difference from embodiment 1 lies in that in this embodiment, the SDP request is sent by ALG1, and the method mainly includes the following steps:

steps 401 to 406 are the same as steps 201 to 206 in FIG. 2;

in step 407, ALG4 judges that there is a shorter path between ALG4 and ALG1 according to the received information associated with each ALG in the path, then it generates indication information to be added into the SDP response to indicate that an optimized media path is expected to be established between ALG1 and ALG4;

in this embodiment, since the new session is initiated by ALG1, the indication information doesn't have to include an association identifier but has to include information associated with ALG4, such as the address information of ALG4.

Steps 408 to 411 are the same as steps 208 to 211 in FIG. 2;

in step 412, ALG1 controls TrGW1b to allocate media resources for connecting the remote end, and ALG1 generates a SDP request by using the media resource information for connecting the remote end of TrGW1b and sends the SDP request, for example, by way of an INVITE request of the SIP signaling, the SDP request is sent by being included in the message body of the SIP request, and the requested target can be obtained from the information associated with ALG4 contained in the indication information;

the execution order of step 411 and step 412 is not limited.

In step 413, the SDP request reaches ALG5, and ALG5 controls media gateway TrGW5 to use the media resource information in the SDP request and allocate media resources for connecting the remote end, and ALG5 generates a SDP request by using the media resource information for connecting the remote end of TrGW5 and sends the SDP request, for example, performing the forwarding by forwarding a SIP signaling including the SDP response;

in step 414, the SDP request reaches ALG4, and ALG4 controls TrGW4b to use the media resource information in the SDP request and allocate media resources for connecting the near end, and ALG4 generates a SDP response by using the media resource information for connecting the near end of TrGW4b and sends the SDP request, for example, by way of sending "200 OK" reply of the SIP signaling, and the SDP response is sent by being included in the message body of the reply;

so far, a media connection is established between TrGW4b and TrGW5.

In step 415, the SDP response reaches ALG5, and ALG5 controls TrGW5 to use the media resource information in the SDP response and allocate media resources for connecting the near end, and ALG5 generates a SDP response by using the media resource information for connecting the near end of TrGW5 and sends the SDP response, for example, the SDP response is forwarded by forwarding a SIP signaling which includes the SDP response, and the SDP response reaches ALG1, and ALG1 controls TrGW1b to use the media resource information in the SDP response;

so far, a media connection is established between TrGW5 and TrGW1b.

Steps 416 to 418 are the same as steps 216 to 218 in FIG. 2;

Step 419 can be performed after step 413 or after step 418, and if TrGW4b is different from TrGW4a, then ALG4 controls TrGW4b to allocate media resources for connecting the remote end, and ALG4 generates a SDP request by using the media resource information for connection the remote end of TrGW4b and sends the SDP request, for example, if after step 418, the SDP request can be forwarded by forwarding a SIP signaling which includes the SDP request, or if after step 413, by way of sending a reINVITE request of the SIP signaling, the SDP request is sent by being included in the message body of the SIP request;

in step 420, the SDP request reaches UE2, and UE2 uses the media resource information in the SDP request, then sends a SDP response including the media resource information of UE2, for example, sending "200 OK" reply of the SIP signaling, the SDP response is sent by being included in the message body of the SIP reply;

Step 421 is optional and can be after step 418 and can also be after step 420, and ALG4 sends a new SDP response along the original session path, which includes invalid media resource information for indicating that the resources in the media path have already been released, for example, if after step 420, the SDP response can be forwarded by forwarding a SIP signaling including the SDP response, or if after step 418, by way of sending "200 OK" reply of the SIP signaling, and the SDP response is sent by being included in the message body of the SIP reply;

in step 422, the SDP response reaches ALG3, and ALG3 forwards the SDP response, for example, performing the forwarding by forwarding a SIP signaling including the SDP response;

in step 423, the SDP response reaches ALG2, and ALG2 forwards the SDP response, for example, performing the forwarding by forwarding a SIP signaling including the SDP response;

So far, an optimized media path is established, and the media path is UE1, TrGW1b, TrGW5, TrGW4b and UE2, and the original media path is TrGW1a, TrGW2, TrGW3, TrGW4a and UE2 which is released after steps 416 to 423, wherein the media connection between TrGW4a and UE2 is updated as the media connection between TrGW4b and UE2 by way of steps 419 to 420. In this embodiment, no media connection is established between TrGW1a and UE1 during the establishment of the original media path, because an optimized media path will be used, and there is no need to establish this segment of media connection.

Though the preferred embodiments disclosed by the present invention is exemplary, it will be understood by those skilled in the art that various modification, change and replacement are possible, and thereby the scope of the present invention is not limited to the above embodiments.

It will be understood by those skilled in the art that the whole or part of the steps in the above method can be completed by means of program instructing relevant hardware, and the program may be stored in computer readable storage medium, such as read only memory, magnet or optical disk and so on. Alternatively, the whole or part of steps in the above embodiments can be implemented by means of one or more integrated circuits. Accordingly, the respective module/unit in the above embodiments can be implemented by use of hardware or software function module. In this way, the present invention is not limited to any particular combination of hardware and software.

INDUSTRIAL APPLICABILITY

By way of the method and signaling gateway of the present invention, the call establishment time can be effectively shorted, providing better usage experience for the user.

What is claimed is:

1. A method for establishing an optimized media path applied in an IP multimedia core network subsystem (IMS), comprising:
   during a process of forwarding a session description protocol (SDP) request and a SDP response, a first application layer gateway (ALG) judging that there is the optimized media path between the first ALG and a second ALG to be established when the first ALG receives a SDP response A responding to a SDP request A sent by the first ALG,
   the first ALG performing the following two steps simultaneously:
   1) sending a SDP request B to the second ALG, and
   2) including indication information in the received SDP response A to obtain a SDP response including the indication information and then sending said SDP response including the indication information;
   the second ALG sending a SDP response B responding to the SDP request B when the second ALG receives a SDP response including the indication information, such that the optimized media path between the first ALG and the second ALG can be established.

2. The method as claimed in claim 1, wherein
   the indication information is used to indicate establishing the optimized media path between the first ALG and the second ALG, and each of the SDP responses including indication information sent by the first ALG and the SDP response B sent by the second ALG includes resource information for establishing the optimized media path.

3. The method as claimed in claim 1, wherein
   the indication information in the SDP response sent by the first ALG includes an association identifier, and in the step of the first ALG sending the SDP request B to the second ALG, the association identifier is included in a session initiation protocol (SIP) message including the SDP request B to the second ALG.

4. The method as claimed in claim 1, wherein the method further comprises:
   when receiving the SDP request B, the second ALG initiating a release of a media path resource established between the first ALG and the second ALG when the first ALG receives the SDP response A.

5. The method as claimed in claim 1, wherein
   the indication information comprises information associated with the second ALG or information associated with the first ALG and information associated with the second ALG.

6. An application layer gateway (ALG) for quickly establishing an optimized media path, comprising: a memory and a processor comprising a switch-out module and a switch-in module which are used in a process of forwarding a session description protocol (SDP) request and a SDP response, wherein when the ALG acts as a first ALG:
   the switch-in module is configured to: when receiving a SDP response A responding to a SDP request A sent by the first ALG, inform the switch-out module;
   the switch-out module is configured to: when informed by the switch-in module, judge that there is the optimized media path between said ALG and another ALG, include indication information in the received SDP response A to obtain a SDP response including the indication information and send said SDP response A including the indication information, and send a SDP request B to said another ALG simultaneously;
   when the ALG acts as a second ALG:
   the switch-in module is configured to: when receiving a SDP response including indication information associated with said ALG and a SDP request B from an entity other than said ALG, inform the switch-out module;
   the switch-out module is configured to send a SDP response B responding to the SDP request B to said entity other than said ALG.

7. The ALG as claimed in claim 6, wherein the SDP response A sent by the switch-out module further includes resource information for establishing the optimized media path.

* * * * *